(12) United States Patent
Shapiro et al.

(10) Patent No.: US 7,787,818 B2
(45) Date of Patent: Aug. 31, 2010

(54) CUSTOMIZED CONTENT DELIVERY SYSTEM AND METHOD

(75) Inventors: Andrew J. Shapiro, Los Angeles, CA (US); Seth M. Skolnik, Los Angeles, CA (US)

(73) Assignee: ioCast LLC, Tiburon, CA (US)

( * ) Notice: Subject to any disclaimer, the term of this patent is extended or adjusted under 35 U.S.C. 154(b) by 629 days.

(21) Appl. No.: 11/691,929

(22) Filed: Mar. 27, 2007

(65) Prior Publication Data

US 2008/0242221 A1 Oct. 2, 2008

(51) Int. Cl.
*H04H 20/71* (2008.01)
*H04H 40/00* (2008.01)
*H04M 3/42* (2006.01)
*H04K 11/00* (2006.01)

(52) U.S. Cl. .................. 455/3.01; 455/3.06; 455/414.1; 455/344

(58) Field of Classification Search ................. 455/3.01, 455/3.06, 66.1, 344, 412.2; 725/81, 121, 725/109
See application file for complete search history.

(56) References Cited

U.S. PATENT DOCUMENTS

| | | | |
|---|---|---|---|
| 6,539,548 B1 * | 3/2003 | Hendricks et al. | 725/109 |
| 6,965,770 B2 | 11/2005 | Walsh et al. | |
| 6,996,393 B2 | 2/2006 | Pyhalammi et al. | |
| 7,302,468 B2 * | 11/2007 | Wijeratne | 709/205 |
| 2002/0138848 A1 * | 9/2002 | Alao et al. | 725/109 |
| 2003/0035075 A1 * | 2/2003 | Butler et al. | 348/734 |
| 2003/0106067 A1 * | 6/2003 | Hoskins et al. | 725/119 |
| 2004/0266336 A1 * | 12/2004 | Patsiokas et al. | 455/3.04 |
| 2006/0085816 A1 * | 4/2006 | Funk et al. | 725/34 |
| 2007/0072543 A1 * | 3/2007 | Paila et al. | 455/3.06 |
| 2009/0064248 A1 * | 3/2009 | Kwan et al. | 725/109 |
| 2009/0288109 A1 * | 11/2009 | Downey et al. | 725/14 |
| 2009/0300672 A1 * | 12/2009 | Van Gulik | 725/31 |

* cited by examiner

*Primary Examiner*—Tilahun Gesesse
(74) *Attorney, Agent, or Firm*—Mel Barnes; Capital Legal Group, LLC

(57) ABSTRACT

A method and system for providing customized content for a plurality of users is provided. In one embodiment, the method may comprise receiving user information from a plurality of users including location information of each user. For each of the plurality of users, the method may include constructing first compilation data that includes information of a first plurality of content elements and wherein the first compilation data constructed for each use may be different. For each of the plurality of users, the method may further include presenting the content elements of the first compilation data to each of the plurality of respective users. The first compilation data may be constructed from a first template, and the method may further comprise receiving feedback from a set of the users, modifying the respective first template of the set of users based on the feedback, and constructing second compilation data that includes information of a second plurality of content elements for the set of users. Finally, the content elements may be scheduled to be transmitted to the user device, such as a mobile telephone, according to rules configured to reduce peak communications network utilization.

33 Claims, 9 Drawing Sheets

301

Compilation Data Delivered

302 Static Content Elements Delivered
during off-peak time period(s);
when device is accessible via another link; and/or
when device is coupled to an internet access
device

303

Dynamic Content Elements Delivered
according to schedule
(e.g., at 25 and 55 minutes past each hour)

304

On-Demand Content Elements Delivered
substantially immediately after request

Figure 9

# CUSTOMIZED CONTENT DELIVERY SYSTEM AND METHOD

FIELD OF THE INVENTION

The present invention generally relates to methods and systems for providing customized content to a presentation device, and more particularly for delivering customized programming content to a programmable presentation device, such as a mobile telephone.

BACKGROUND OF THE INVENTION

Advances in processor, memory, network and telecommunication technologies, have led to a proliferation of media services. In addition to the traditional over-the-air broadcasting of radio and television signals, audio and video content (collectively "media content") also are being delivered over cable, twisted pair, satellite, wireless, optical fiber, and via other mediums. Media content is available for the television, personal computer, mobile telephone, portable audio players and other devices using various protocols, such as digital audio access protocol, real data transport, DVB-IPI (open standard), variable audio distribution and interface system (VADIS), Windows Media video® (MSV), Windows Media audio® (MSA), and advanced systems format (ASF). On-demand video content (meant to include video content that also includes audio content) is available over cable, fiber, and via the internet. Streaming audio and video content is available via the internet. Video and audio recording devices allow content to be experienced immediately or at some time after delivery.

As a result of these technological advances, consumers have many more options for accessing and experiencing media content. Telecommunication carriers and mobile virtual network operators are beginning to offer revenue-generating, value-added content services, such as streaming audio and video and downloadable audio and video. For example, stock market information is available as real-time streaming content. Audio and video podcasts are available for download and playback.

These technological advances have been accompanied by increased consumer demand for these new forms of media delivery. Wireless carriers see potential profits for these new services. One of the challenges, however, for delivering media content wirelessly, is in providing sufficient network capacity to meet the consumer demands. While 3G technology, for example, may dramatically increase data rates available to an individual wireless user, such technology only modestly increases spectrum utilization efficiency. Accordingly, there is a need for an efficient system of delivering value-added media content to consumers.

With regard to the wireless telecommunications networks, network capacity can be increased by adding equipment to cell sites if sufficient unused spectrum is available or by building new cell sites. Another solution, as offered by this invention, is to make efficient use of network resources to deliver value-added consumer media services.

To date, terrestrial radio, television, digital radio, and other media services typically are not customized. Similarly, podcasts are not customized. As an example, in prior art media services a user typically tunes to a predefined channel and experiences a fixed media content programmed for a pre-scribed demographic audience. For example, all users who watch the same television channel experience the same programming. A solution of this invention is to provide individually customized content shaped by the user.

In addition, in broadcast media advertisers receive little or no direct information from users to improve their response rate or to tailor their advertising. In other words, advertisers often must estimate the effectiveness of advertisements for broadcast media. Thus, there is a need to provide more interactivity between users, advertisers, and the service provider, which may be provided by various embodiments of the present invention.

In addition, many other methods of delivering media content do not facilitate social networking or allow users to share content with each other. Further, in systems that do permit sharing, there often is a difficulty in managing digital rights of content providers.

These and other challenges of prior systems may be addressed by various embodiments of the present invention.

SUMMARY OF THE INVENTION

The present invention provides a method and system for providing customized content for a plurality of users. In one embodiment, the method may comprise receiving user information from a plurality of users including location information of each user. For each of the plurality of users, the method may include constructing first compilation data that includes information of a first plurality of content elements and wherein the first compilation data constructed for each use may be different. For each of the plurality of users, the method may further include presenting the content elements of the first compilation data to each of the plurality of respective users. The first compilation data may be constructed from a first template, and the method may further comprise receiving feedback from a set of the users, modifying the respective first template of the set of users based on the feedback, and constructing second compilation data that includes information of a second plurality of content elements for the set of users. Finally, the content elements may be scheduled to be transmitted to the user device, such as a mobile telephone, according to rules configured to reduce peak communications network utilization.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 9 is a graphical representation of a delivery scheme of a delivery system in accordance with an example embodiment of the present invention.

DETAILED DESCRIPTION OF ILLUSTRATIVE EMBODIMENTS

Figure 1:
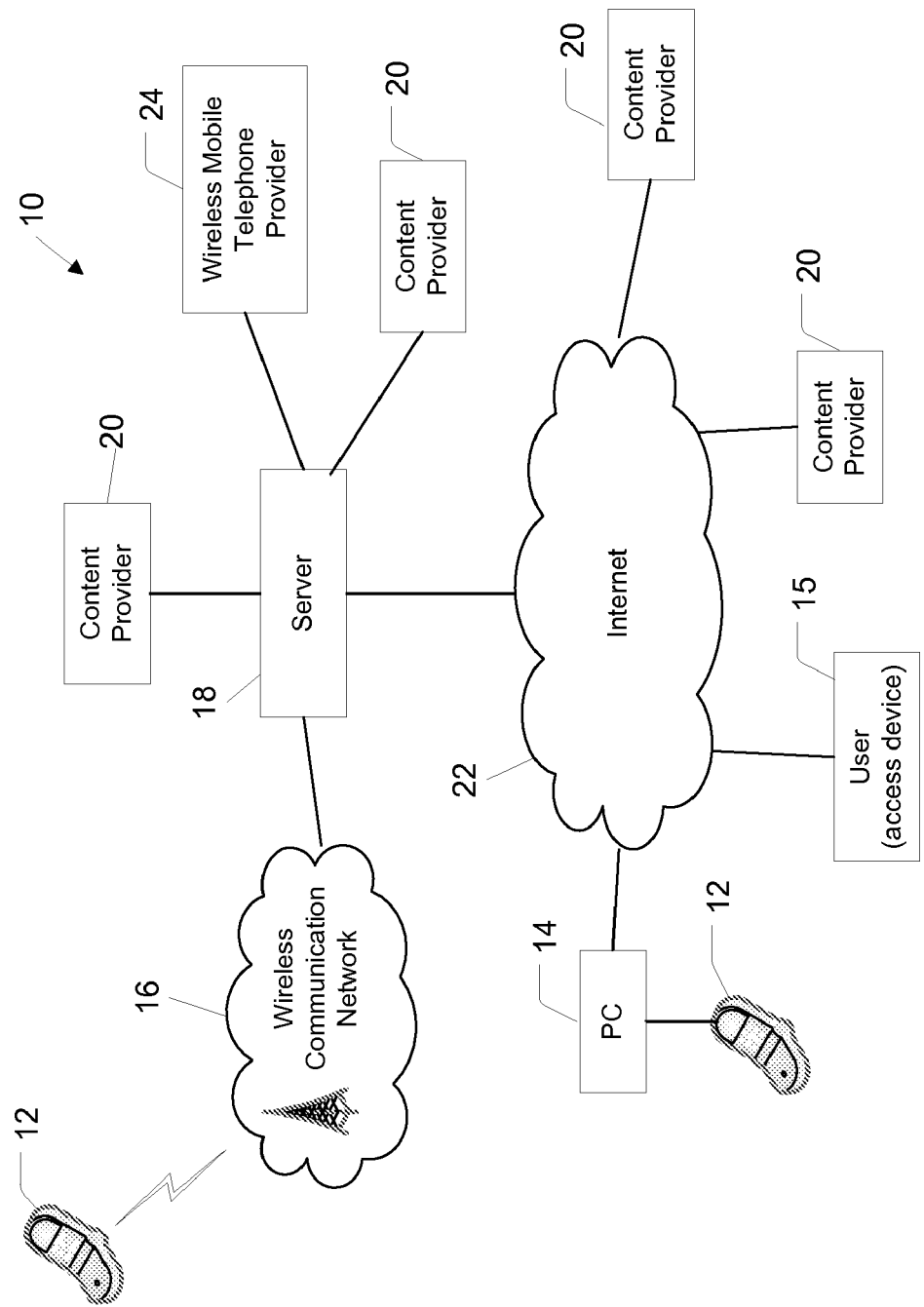
FIG. 1 is a block diagram of an example network environment for hosting a media content delivery system.

In the following description, for purposes of explanation and not limitation, specific details are set forth, such as particular networks, communication systems, wireless networks, mobile telephones, servers, computers, terminals, devices, components, techniques, data and network protocols, software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, wireless networks, mobile telephones, servers, computers, terminals, devices, components, techniques, data and network protocols, software products and systems, operating systems, development interfaces, and hardware are omitted so as not to obscure the description of the present invention.

Overview

According to various embodiments of the invention, methods and systems are described for providing customized media content (also referred to herein as "content") to a user. A user may subscribe to a content service which offers customized content accessible via a user device, such as a mobile telephone, personal digital assistant (PDA), a portable communication device, personal computer, a portable media player, a car audio/video system, a home audio or theater center, a device having the capability of accessing the internet, a multifunction device, or another audio device or video device. In various embodiments, audio content, video content, image content, textual content, or any combination of these forms of media content are delivered. For ease of discussion, unless otherwise specified "content" refers collectively or individually to any type of media content, such as, for example, music, song, image, video, weather, talk, advertisement, promo, liner, talk-up, etc. For ease of discussion, unless otherwise specified "content element" refers to an individual song or segment. Similarly, the word "song" is meant to have its ordinary meaning and include music and the term "segment" is meant to refer to non-music content such as, for example, image, weather, talk, advertisement, promo, liner, talk-up, and others. The term "content element" is meant to refer to an individual piece of content (an individual song or segment). In some discussions, the term non-segment may be used to refer to songs or audio-video content elements. While the embodiments described herein are described in the context of system that selects, customizes, and delivers content that is audio-centric, the invention is equally applicable for selecting, customizing, and seamlessly delivering content that is video-centric (i.e., television programming (TV shows, music videos,), movies, news, talk, weather, etc.). In most instances, the term "video programming"—meant to refer to movies and television programming—may be used instead of "song" throughout the description below to provide a description of a video-centric customized content delivery system.

The content service may provide a media experience that is personalized with music, information (news, traffic, weather, events), talk, advertising, promotions and personal style (upbeat, laid back, etc.) selected for each individual user based on that user's demographics and user profile, which may be user-specified preferences as well as determined from analysis of user behavior and explicit user feedback. The system may provide a seamless presentation of content (i.e., provide a radio (or television) like experience as the sequence of content elements are presented) and also may be interactive, allowing the user to modify the programming on-demand, such as choosing to pause, replay, or skip current content to immediately access or substitute other programming. In addition, the user's content may be localized with traffic, weather, local news, events and commentary tailored to the user's location to enhance the content's relevance to the user and to create the sense of local community that traditional broadcast radio, for example, delivers. In addition or alternately, the user's content may be localized to a particular location identified by the user such as, for example, weather, local news, events and commentary tailored to the location(s) supplied by the user (e.g., the user's home town, college town, parent's town and/or other area) to enhance the content's relevance to the user.

In an example embodiment, a user subscribes to one or more programs. A program may be analogous to a media channel, such as a radio station or television channel (although in contrast to such a channel it may be customized via methods of the present invention). Thus, a program includes selections of content elements and may include content elements that are unrelated or related, such as songs of a specific genre (e.g., jazz, pop, rock), specific artist, selected by a particular entity, and/or other grouping or relation. The selection of content for each program may be determined by, and based on, a template, with each program having a different associated template. At a server, a template is used to create compilation data (comprised of one or more data files) that is transmitted to the user device. The compilation data includes content lists, pointers to media files, and other information necessary for the user device to create a seamless presentation for playback to the user. Depending on the embodiment, the necessary media content (songs, talk, advertising, jingles, promotions, etc.) is transmitted to the user device either upon a request from the user device or by initiation of the server. The user device (or server, depending on the embodiment) keeps track of the content that is needed to be transmitted in order to reduce the resources (e.g., network resources, mobile phone minutes, battery life, etc.) needed to transmit the content to the user. In other words, some content identified in the compilation data may not be transmitted to the user device because it is already present on the user device. The user device uses the compilation data to determine the content elements, content sequence, and other parameters for presentation of the program to the user. Because a user may subscribe to multiple programs, multiple compilation data files may be constructed and transmitted to the user device (as well as the necessary content elements).

The compilation data for a program may be updated periodically, such as nightly, or in response to modifications to a user's profile, which may result from implicit or explicit user feedback, to allow the user to receive new content based on a modified (or new) template. In addition, some content may be updated throughout the day, or during the listening or viewing experience. For example, traffic, news, weather, and other such content may be updated upon receiving a user request for the content or in anticipation of playing that content to the user. More specifically, if the user elects to hear the weather, news or traffic segments each half hour, new content for those segments may be transmitted to the user device each half hour (e.g., if the content for the segment has changed), a few minutes before the scheduled presentation time. While much of the content may have been downloaded in advance and stored on the user device (i.e., not be "live"), other content may be streamed for real-time (or near real-time) presentation to the user (i.e., be presented as substantially live content).

The user's interaction with the user device for a program may be stored in the device. For example, the user may skip content (e.g., skip to the next content element), rate content (i.e., indicate his or her dislike or like of a particular song, artist, etc.) and provide other input to the user device. The stored data (i.e., a log) of the interaction may then be transmitted to the server and used as explicit and implicit feedback to modify the templates corresponding to that user for future construction of programs.

In one embodiment the service may be delivered over a wireless data network, such as, for example, a mobile (e.g., cellular) telephone network, a wireless Wide Area Network (WWAN), or other wireless data network. Mobile telephone networks, as used herein, is meant to include (without being limited to) analog and digital cellular telephone networks, including, but not limited to AMPS, 1G, 2G, 3G, GSM (Global System for Mobile communications), PCS (Personal Communication Services) (sometimes referred to as digital cellular networks), 1× Evolution-Data Optimized (EVDO), and other cellular telephone cell networks. In other embodiments, the service may be provided via the internet, or a combination of a wireless network and the internet. Thus, the user may experience the content from his her mobile telephone (or other handheld device), automobile media system, laptop, or other portable device or from his or her desktop computer, home theater system, home audio system, or other fixed or semi-fixed presentation system/device.

Some embodiments of this invention include the efficient use of the delivery network's resources, an ability to provide high quality audio and/or video, less battery drainage, and glitch-free program playback even during intermittent or complete loss of network connectivity. Specifically, in some embodiments the bulk of the transmission of content to the user device occurs during off-peak hours, such as when the user device is charging, or via low cost (including free) wired or wireless networks or when the user device is communicatively coupled to an internet access device such as the user's computer. For example, the user device may be configured to request and receive content upon establishing a communication link to the internet via a wireless Local area network (WLAN) (e.g., a free WiFi network (an IEEE 802.11 compatible network such as an IEEE 802.11 a,b,g, n, or other such IEEE 802.11 standard) or WiMAX network (IEEE 802.16) or a wireless personal area network (wireless PAN). In addition, some embodiments may have the ability to control the timing of delivery on a device by device basis, based on the location of each device, location of other devices, network capacity, level of service (e.g., to the user), and/or other factors. Because the content is being communicated via low cost resources in these instances, high quality content (which typically comprises more data than low quality content) may be provided.

More specifically, the service may consume a small portion of the peak-hour wireless network capacity that a pure streaming service consumes. Thus, widespread use need not (1) necessitate wireless carrier investment in more capacity, (2) result in associated network planning problems, or (3) be prohibitively expensive to the subscribers. Embodiments of the system may deliver much higher bit-rates, and therefore higher quality audio (even DVD Audio) and/or video, than other digital audio or video services without burdening the network. The bit rate and therefore quality need not be limited by the bandwidth available to a user at the moment of playback. Most presentation of content, particularly of audio and video, does not require an active connection to a network, so the service may be largely impervious to the inevitable connectivity drop-outs that occur when a mobile device is moving at high-speeds (e.g., in an automobile), is being handed-off between cells, or is in use during peak-hour operation. In some embodiments, much communication occurs while the user device is plugged into an electrical power source (e.g., charging), so there is minimal battery drain from wireless transmission. As a result, the portable user device can be used to play media content for extended periods of time even where there is no network coverage, whether in rural areas, in tunnels, deep inside buildings, on airplanes, etc.

In some embodiments, the user may buy or elect to hear more information related to an advertisement or promotion. This interaction is recorded and may be provided to the advertiser immediately, or at a later time. Consequently, in some embodiments advertisers may have increased interactions with users. For example, a user may select to hear more information about a product, service or promotion being advertised by providing a user input to the user device. Receiving this information, the advertiser can determine what advertising is more effective to what individuals or groups and adjust the advertising campaign accordingly. In some embodiment user program preferences can be shared with other users in a manner where digital rights are maintained thereby building a social network among subscribers and fostering loyalty to the service.

Thus, as an overview, depending on the embodiment and implementation, the present invention may provide an automated personalized program of discrete content elements by one or more of (a) receiving and processing (manually or automatically) content and associated metadata from content publishers (e.g., radio stations may upload content); (b) incorporating market data from third party sources into content selection and program creation (e.g., media popularity and descriptive data); (c) incorporating observed implied public data relationships between content into content selection and program creation—(e.g., people who like artist A (or song A) usually also like artist B (song B)—artist correlation); (d) using initial user preferences for initial content selection and program creation, including user preferences, demographics, interests, zipcode, and preference of radio stations (or other media sources), in the program selection process; (e) reflecting human program parameter definitions in content selection and program creation (e.g., a program director can modify programs or a DJ can specify specific songs in conjunction with talk-ups); (f) incorporating implicit and observed information into content selection and program creation (e.g., user location, user behaviors, influencer behaviors, collaborative filtering, etc.); (g) incorporating explicit information into content selection and program creation (e.g., user ratings, influencer ratings, influencer share requests, user-specified filter parameters by content attributes [music knobs, seed artists, DJs], user-specified filter parameters by frequency [mix sliders], etc.); and (h) enhancing of sequence of content elements using an iterative process to ensure separation of conflicting content (artist separation for songs, competitor separation for advertisements).

One or more embodiments also may incorporate an the efficient delivery and presentation of media content including one or more of (a) separation of data and media files in delivery of content; (b) inclusion of media already owned by user and present on the user device; (c) using a download process that can dynamically allocate processing based on priority; (d) improving the efficiency or optimization of local cache according to content priority, reuse, user preferences to minimize (or reduce) bandwidth and to maximize (or improve) available programming; (e) integration of content of various bit resolutions into single seamless presentation based on content-specific requirements for quality (e.g., music may be accorded a high bit rate, while talk segments a low bit rate); (f) seamless presentation of content elements (e.g., using timing cues, cross-fading, and other metadata along); (g) integration of downloaded and streamed content; (h) automatic modification of content format to best fit the device and network capabilities; and (i) scheduling of delivery based on (1) the timeliness nature of the content elements—static content elements (e.g., songs) versus dynamic content elements (e.g., traffic, news); (2) expressed demand for content (e.g., a jump command from the user); (3) demands of other users who are being served over shared infrastructure (e.g., users' communications are distributed over time); (4) network connectivity patterns (e.g., determining and/or learning when a user has better and/or lower cost connectivity); (5) the user device's power source and/or charge status; (6) the user's level of service (based on differentiated pricing); (7) network operator requirements; and (8) other device connectivity requirements (for phone calls or other data connections).

In addition, one or more embodiments of the present invention may provide integration of sequenced, scheduled, and on-demand content wherein the presentation of scheduled content elements can be seamlessly integrated with sequenced content elements; and a sequential or scheduled program presentation can be seamless transitioned back and forth to on-demand content presentation at the request of the user (e.g., user can jump, request more artist info, request more advertiser info, etc.).

FIG. 1 illustrates an example of a network environment 10 for providing a customized content delivery system according to one or more embodiments of the present invention. A consumer may subscribe to the service, and provide user information, via a computer 14 (via the Internet) or via a user device 12, such as mobile telephone 12. The user also may receive content at the user device 12 or computer 14. Thus, the user device 12 may access a wireless communication network 16 (a wireless mobile telephone network in this example embodiment) to establish telephone calls, to receive media content, to provide feedback to a media content service provider, to make purchases, to respond to advertisements, and for other communications. A server 18 may be communicatively coupled to a wireless mobile telephone network 16. In this example, the server 18 hosts various processes for managing the customized content delivery service including, receiving and processing user feedback, generating compilation data for the plurality of users, receiving content from content providers 20 and providing content to user devices 12. The server 18 may receive content from various content providers 20, such as web sites, radio stations, television stations/broadcasters, satellite radio stations, etc., which may then be supplied as content to the user device 12 according to the present invention.

To make efficient use of the wireless communication network 16, an efficient delivery methodology may be used. Some media content may be streamed from a content provider 20 through the server 18 and/or wireless network 16 for immediate or near-term presentation to the user, while other content may be downloaded or updated to be stored periodically, aperiodically, or on request. In an example embodiment, compilation data may be loaded onto a portable communication device 12 through the wireless network 16 during off-peak hours while the portable communication device is plugged into a power outlet. In another embodiment, compilation data may be loaded onto the portable communication device 12 from the consumer's personal computer 14. For example, compilation data may be downloaded from the server 18 through the internet 22 to a subscriber's portable computer 14 for concurrent or subsequent transfer to the user's portable communication device 12. Media content already owned by (including licensed to) the user and stored on their personal computer 14 or home entertainment center also may be loaded onto the portable communication device 12 and included in a program within the radio-like (or television-like) experience. Thus, the server 18 may include an inventory of the user's content.

In some embodiments, media content may be received from radio stations from around the world and from other content providers 20 to deliver local content (such as local news, traffic and weather), and non-local content (such as music, talk and podcasts) to subscribers around the world. The content of a single program may include content from a plurality of the content providers 20. By including traditional radio sources with other sources of media, users may continue to enjoy local on-air personalities and a sense of the local community. The radio stations get to leverage their local brand equity, promotional activities, community presence, and advertising sales capabilities, while expanding their base of listeners(e.g., by reaching listeners who are located outside of the over-the-air broadcast area), strengthening their bonds with existing listeners, and creating new revenue streams.

The content providers 20 may communicate media content to the server 18 using any of several methods. For example, some providers 20 may transmit content to the server 18 through the internet 22. Other providers 20 may have an alternative manner of communication with the server 18, such as by a direct wired or wireless link. Still other content providers 20 may provide physical media for access by the server 18. In some embodiments, the content may be received via a wireless broadcast signal (e.g., digital or analog television, digital radio, satellite radio, conventional AM radio, or conventional FM radio). The subscriber's wireless mobile telephone provider 24 also may be in communication with the server 18, such as for billing and network metrics analysis as well as providing content.

In an exemplary program experience, a consumer may select a program and listen to a group of songs that have been downloaded from the server 18 the previous night. Occasionally local news, traffic and weather reports may be seamlessly interjected as another content element of the program or may be played upon demand by the user. Such local content may be streamed in real time or downloaded and offset for playback upon completion of download or in the near-term (e.g., after the next song; on the half hour). Clips of on-air personalities or other sessions from radio stations also may be downloaded in advance or streamed in real-time as part of a program and played (presented to the user). Liners and talk-ups by on-air personalities and other DJ's may be used to introduce songs and transition between content elements. The term "liners" is meant to refer to a relatively short content element typically used to transition between other content elements and to identify and/or brand the content provider (e.g., "This 99.5 hotrock . . . "). The same liner may be played repeatedly throughout the program. The term "talk-ups" is meant to refer to a short content element typically used to transition between other content elements and to convey information to the user such as, for example, to introduce the next song. Talk-ups may be played repeatedly as well.

The user device may include a media player that includes multiple logical channels for mixing according to the program. For example, songs may be queued and played on one channel, while dynamic content such as local weather and traffic is queued and played on another channel. Advertisements may be queued and played from yet a third channel, while liners play from a fourth channel. Various content elements of a program may be mixed for playback based upon data in the program template. Advertisements and promotions also may be included in a program for presentation to the user during a program. Local news, weather and traffic, and/or other dynamic content, may be scheduled to play at a select time or after a select time interval according to the program. The media player may cause the presentation to stop, or pause, a first channel to play the dynamic content on a second channel, and to periodically play advertisements. The percentage of time allocated to advertising and promotion may be based upon the type of subscription purchased. A more expensive premium service may include less (or no) advertising and promotion as compared to a standard subscription.

Activation of the Service

Figure 2:
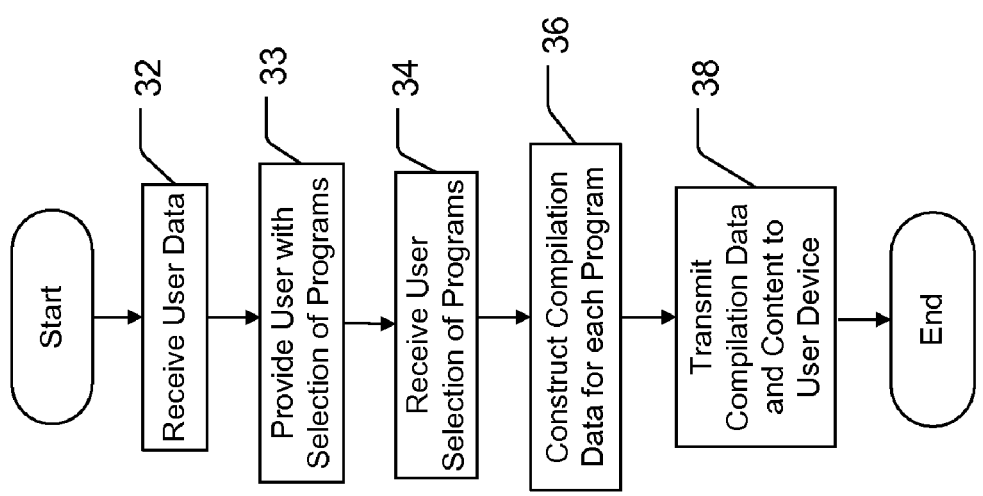
FIG. 2 is a flow chart of an example embodiment of a process for generating a user profile for a media content delivery system.

At activation of the service by a user, the system must select and provide appropriate content to the user. The content delivery system may include the ability to customize program content based upon user demographics, user location, user preferences, user listening habits, and user feedback. After activation, both explicit and implicit methods of determining user preferences (which form part of a user profile) may be implemented. FIG. 2 depicts a profile generation process for generating a user profile, such as when initiating service for a user. A user may subscribe to a media content delivery service by accessing a web site with a personal computer 14 or other access device 15 (e.g., a mobile telephone or other device) over the internet or via the mobile telephone network, a broadband provider, or a WLAN. During registration, a profile generation process may be executed at the server 18 (or at the user's computer 14 or access device 15). At step 32 the user may submit demographic and other information. This information may include age, sex, location information (e.g., zipcode, address, county, state, area code, telephone number, etc.), income information, special interests (e.g., hobbies), birth date, year of birth, employment information (e.g., field of employment, position, title, etc.), ethnicity, marital status, parental status (i.e., how many children), and other data.

In addition, the user may provide information of his or her content preferences such as information of media sources such as one or more radio stations, radio programs, television channels, television programs, artists, DJs, talk shows, and/or media personalities, that the user likes (and/or dislikes), listens to and/or views, and/or would like to listen to and/or view. In addition, the user may provide information of his or her content taste such as the genres of music, and/or other information that he or she prefers.

In an example embodiment, the program(s) of audio content (e.g., music) may be selected and customized (initially selected and later modified) based on user-specified media source and preferences, including: preferred radio stations, favorite artists, mix of unknown vs. familiar, mix of mainstream vs. eclectic, etc. Other factors for selecting the content may include the contents of the user's existing music collection as present on a user device and/or user defined customization. Talk-based content and format also may be customized based on specified preferences. For example, the user may provide information and/or may select among preset programs which may have associated DJ's, or the user may customize a selected program or "design" their own program by selecting one or more particular on-air personalities. The user may specify timing and frequency of music, talk, traffic, weather, news, sports, local events, promotions, comedy segments, etc. The user's location may be provided by the wireless service provider, via a GPS enabled phone, automobile, or other device, or via any other suitable means.

Based on the information from the user profile information (e.g., location information, demographical information, content preference information (e.g., media sources and/or content tastes), and/or other information), the server 18 may identify one or more programs that are more likely than others to be appealing to the user. At step 33, the server 18 transmits a list of the identified programs to the user for selection. The user then the selects one or more of the programs to which he or she wishes to subscribe, and information of the selections is received by the server 18 at step 34. Accordingly, at step 36 the customized program(s) may be generated. More specifically, the template(s) associated with the selected program(s) are then used to create the compilation data for each program, including, for example, what type of music is selected, how often and when traffic, weather and other dynamic content (which may be local content) is presented. The user information (e.g., age, interests, hobbies, sex, location and/or other information) may be used to select advertising, local weather content, local traffic content, and, in some embodiments, local news content, and local talk content for the program(s) for the selected programs. At step 38, the compilation data and, if necessary, media files (files that include the content) may be transmitted to the user device 12 for storage in memory. As discussed, in some embodiments the content may be delivered at a different (later) time than the compilation data.

As discussed, the compilation data provided to the user device 12 is constructed from a template that may represent algorithms and include pointers for accessing and playing a sequence of content elements and facilitating user interaction with such sequence. The compilation data generated by a template may include multiple lists of content elements; instructions for how often, when and in what order to retrieve and present a live media stream, (e.g., local news, traffic and weather) or download content (e.g., local news, traffic and weather); pointers to media segments, and other data. A content element may have many attributes associated with it, such as information about a specific media file, including information of the title, artist, and album, timing cues to facilitate seamless or cross-faded transitioning among play items, dates and times that indicate the time period during which an item may be played, whether the item content is static or dynamic, a user rating, whether the user has permission to skip the item or to replay the item and other attributes.

Associated with a program, and identified in the compilation data may be a welcome play list, a sequence play list, a schedule play list and multiple rotation play lists. The welcome play list may be an introduction to identify the program and/or a content element, followed by the content element. A sequence play list may be a sequence of content elements to be played after a welcome play list completes. The schedule play list may include content elements to be presented to the user at specific times (or time windows), and which may, in some instances, interrupt playback of another play item or list. A rotation play list may include multiple content elements (typically songs or videos) that are to be played one after the other, (e.g., like a stack of record albums or a sequence of audio CDs) interspersed with content elements in the sequence and schedule play lists. The content elements of the rotation play list may be played repeatedly in the same or different sequence.

The various categories of content may be assigned different priorities in order to prioritize the transmission of the content to the user device. In an example embodiment, three priority levels of content are used (e.g., low, medium, and high). Low priority may be assigned to content such as music, advertising, talk, and other content that does not change quickly and is often re-played to the user over time. Medium priority may be assigned to anticipated dynamic content that changes frequently (e.g., news, weather, traffic). For example, if a program requires that the weather be played to the user once per hour, the weather segment may be assigned a medium priority so that it is downloaded each hour. As used herein, content that has been requested (e.g., by the user) for substantially immediate presentation is referred to herein as "on-demand content" and may include, for example, content such as traffic, weather, news, songs, or videos. High priority may be assigned to on-demand content such as traffic or weather content that is to be immediately presented to the user such as, for example, in response to a user request for the content. A media player for playing the content may include multiple queues with transmission priority assigned to the highest priority queue having a content request. For example, a medium priority queue may include a request for weather content (to be presented in the next hour) and a user (via a navigation screen on the user device) may control the program experience to request dynamic content (e.g., a traffic update). The traffic content request may be allocated higher priority, placed in the high priority queue, so that the traffic content is received before the weather content and other lower priority content. The song currently being played to the user may continue for a period of time (e.g., one to thirty seconds) until the higher priority content is received. Upon receipt, the current song may be stopped, or paused until after the downloaded on-demand content is finished playing, and then the song may resume.

A user may switch among programs to listen to different content (as derived from a corresponding program). Also, as discussed the play lists for a program may rotate meaning, for example, that songs from the same group of songs (the rotatable play list) may be selected for play repeatedly over a given time period (hours, days, or weeks) in the same or different sequence (to thereby provide the content for a non-specific song type identified by the compilation data).

In some embodiments, as the subscriber uses the service and listens to the media content, explicit and implicit feedback indicative of their listening preferences may be obtained, which may be used to modify the template for that user. For example, when a user is listening to a song, the user may skip the song, or rate the song (positively or negatively). Alternately, the user may re-play a song (indicating that the user likes the song and/or artist). User interactions are stored on the user device 12 for transmission to the server 18 and comprise implicit feedback. In addition, through interaction with the server 18 (either via a computer 14 or the user device 12), the user may provide information for modifying the template for the user, which comprises explicit feedback. More specifically, the user may indicate a desire to modify the frequency and/or amount of specific types of content. For example, the user may request less or more songs, news, traffic, weather, talk or other type or sub-type of media content. As another example, the user may request less or more content from specific artists and/or genres. Again, the explicit feedback data may be stored at the user device 12 (or computer 14), and transmitted to the server 18, either in real time or periodically. Such transfer may occur directly over the wireless communication network 16, or indirectly over the internet 22 via the user's computer 14 or other access device 15. In addition, for embodiments in which the portable communication device 12 directly accesses the internet, the transfer may occur directly via the internet.

Figure 3:
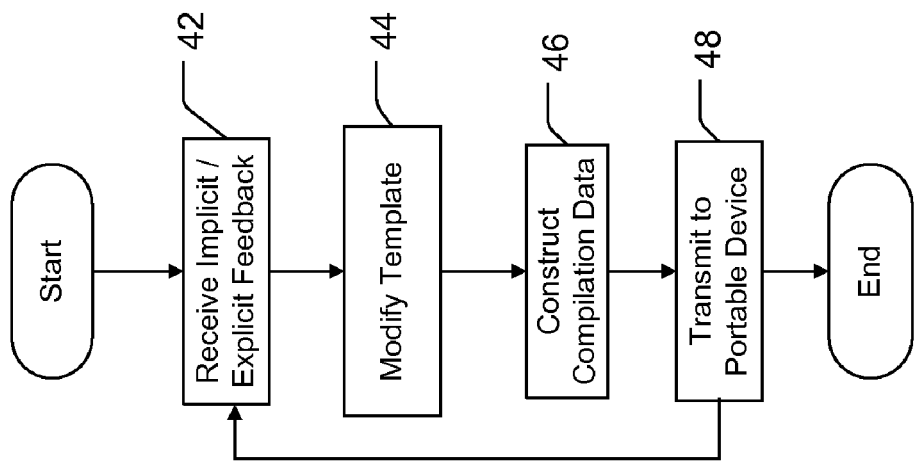
FIG. 3 is a flow chart of an example embodiment of a process for updating a user profile for a media content delivery system.

FIG. 3 depicts a process for modifying a template based on feedback from the user, which is performed for the plurality of users who subscribe to the service. As described above, a user may provide implicit feedback (e.g., while listening to the media content) and/or explicit feedback. At step 42, the implicit and explicit feedback stored on the user device 12 is received by the server 18. At step 44, the user's templates are modified based upon the feedback. In some embodiments, feedback provided for one program may also cause the template of one or more other programs to be modified. In some embodiments, feedback may cause a user's global preferences to be changed in such a way that subsequent compilation data may be modified. In this example embodiment, the feedback provided for each program is used only to modify the template associated with that program. In another embodiment, the explicit feedback provided for one program may also cause the template of other programs to be modified while implicit feedback is used only to modify the associated template. In still other embodiments, the user can indicate whether explicit and/or implicit feedback should be used to customize all templates, select templates, or only the associated template. At step 46, the compilation data is constructed for each program based on the modified template(s). In practice, some templates may be modified while others may not be modified (because no feedback has been received). At step 48, the compilation data and content (e.g., immediately or at a later time) are transmitted to the user device 12. The process of FIG. 3 typically will be performed for each program and may be implemented each time new feedback is received, daily, weekly, monthly, and/or at any other time intervals.

User Device Interaction

In some embodiments, a user may control various aspects of the presentation of the content to suit their immediate needs. For example, a user may pause a segment, skip a segment (skipping of certain types of segments such as advertising may be precluded or limited), or replay a segment (e.g., skip backwards a fixed amount of time or to the beginning of a segment). The user also may jump to specific segments for immediate play, including traffic, weather, sports reports, news, and local event information, after which play of the prior segment is resumed. The user may specify that certain information, such as traffic, weather, news, or other content play at certain times or certain intervals. The user also may enable alerts (breaking news, traffic) to interrupt the presentation of content (songs), bookmark a song or artist, purchase a song or album, or recommend a song or artist be added to a another subscriber's content. A user additionally may request an immediate additional (second) song of an artist upon hearing a first song by that artist that the user likes. A user also may request additional information of an advertisement or promotion (or to purchase the advertised product), which information may be transmitted to him immediately or later via a text message, email, or other suitable means from the server or directly from the advertiser.

Figure 4A:
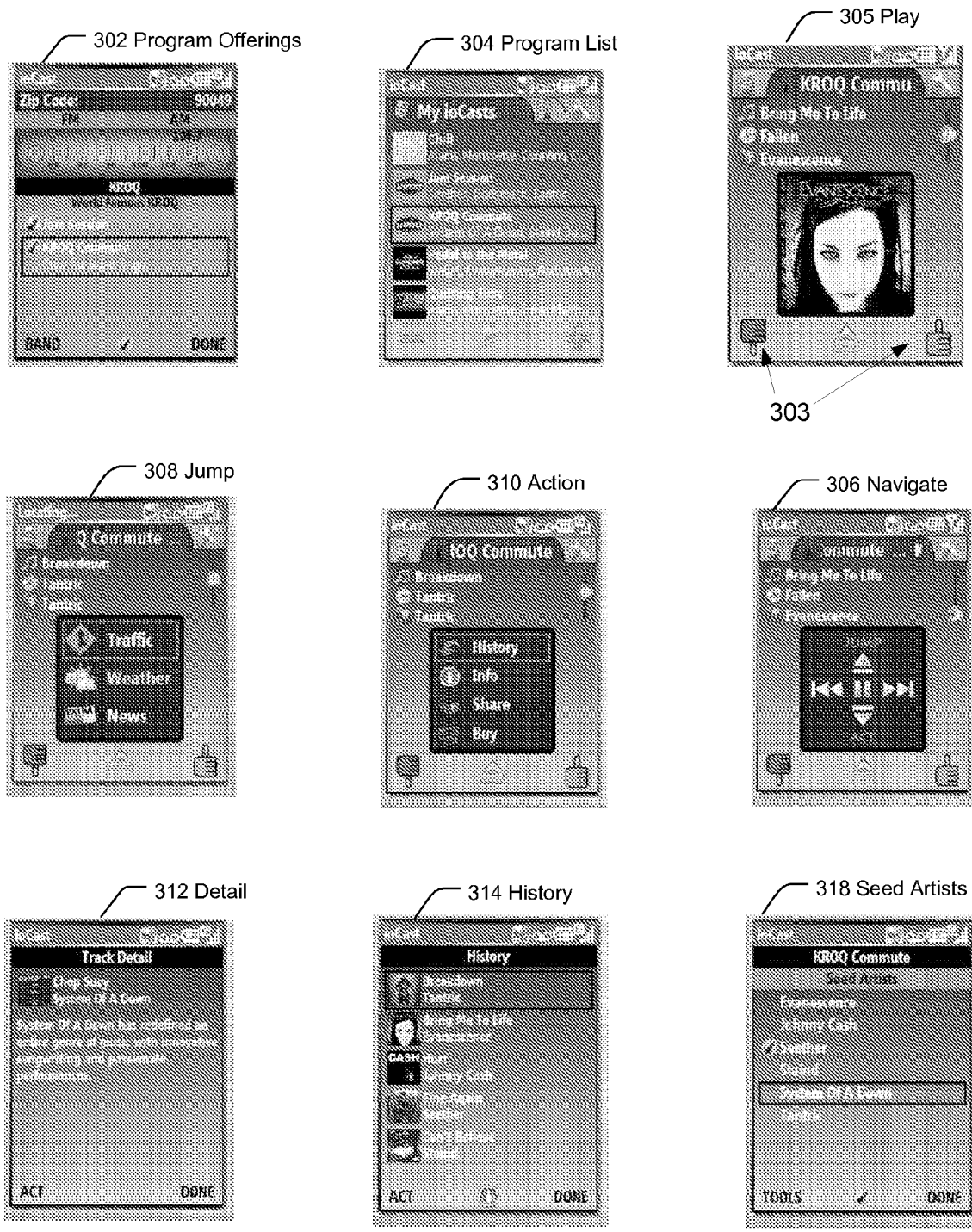
FIG. 4 is a diagram of exemplary user displays for interacting with a media content delivery system.
Figure 4B:
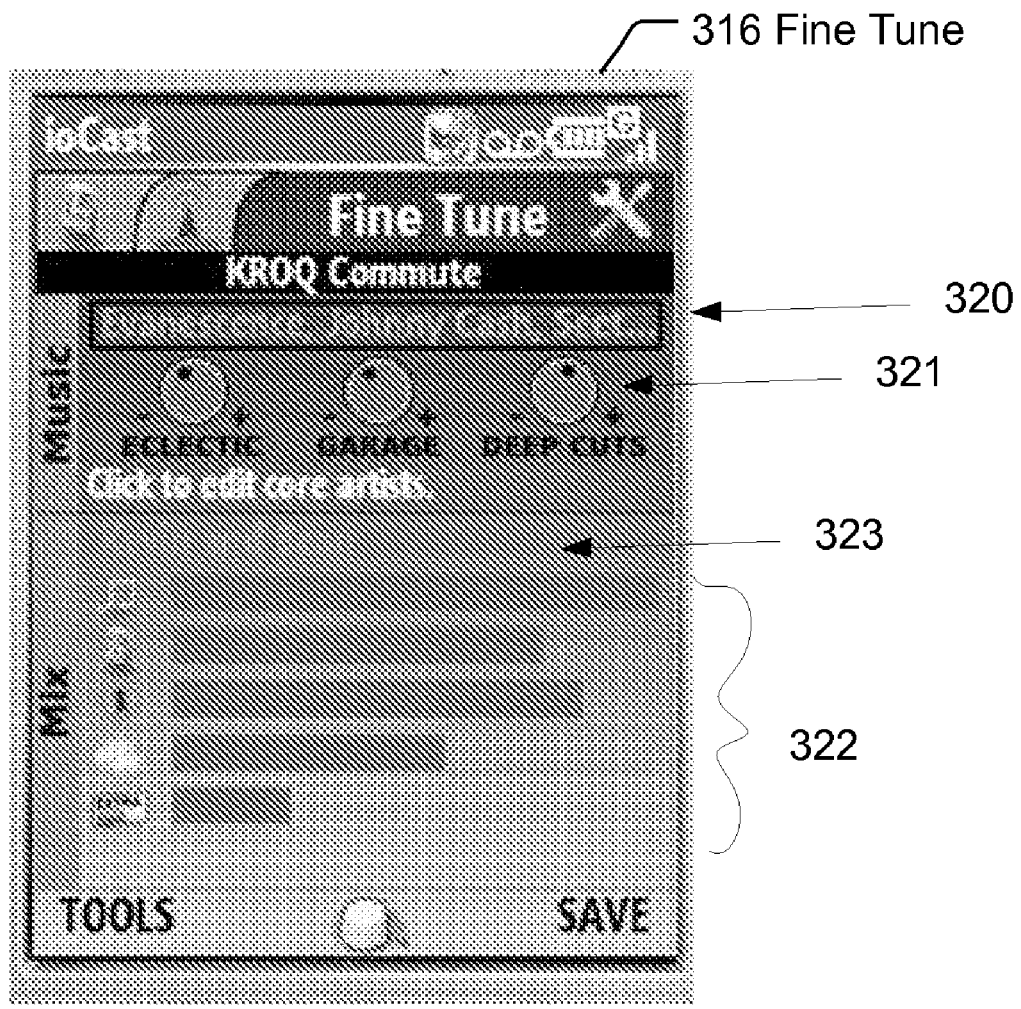

FIG. 4a depicts some exemplary user interface screens for providing such interaction, including controlling presentation of the content, for a mobile telephone being used as the user device 12. After a user registers for the service and provides the user information to the server 18, the server 18 selects programs that are most likely to be appealing to the user. The selected programs are then transmitted to the user device 12 to allow the user to subscribe to one or more of the programs. Screen 302 of FIG. 4 depicts an example interface displaying the programs selected by the server 18 and offered by the service. The user may subscribe to any of the programs by selecting one or more of these programs to be available on the user device 12. Based on the selections and user information, the service may then construct and transmit the compilation data and content (if necessary) of the selected programs according to the methods described herein. The selected programs are added to the user's subscription list of programs, which is depicted in screen 304. The user then may select from the Program List display 304 to commence play of a program. In some embodiments, upon initiating the service for a given day or at a given time of day, a default 'welcome' program (previously selected by the user) may commence. In another embodiment the "Programs List" display 304 may appear allowing the user to select a program.

When a program is requested for play, a Play screen 305 may be displayed which includes, in the case where a song is playing, information of the artist, album and song and representation of the album cover or other image (e.g., photo of artist), or in the case where a talk-based segment is playing, information of the personality, song title, and other textual and graphical information related to the subject matter. In some embodiments, the Play screen 305 may include video content that is synchronized with audio that is being played. The Play screen 305 also includes a user rating interface 303 to allow the user to rate content being played by selecting the thumbs up or thumbs down symbols.

While the user is listening to content, the user may navigate through various screens. Screen 306 illustrates an example navigation screen with controls that allow the user to pause, stop, and start playback; go to a jump screen 308; go to an actions screen 310; rotate forward within play lists associated with the program; rotate backward within play lists associated with the program; rate the current song or other content element (selecting the thumbs up or thumbs down symbols).

When the user activates the jump command from the navigation screen 305, a jump screen 308 may be presented, including a list of categories of media content (e.g., traffic, weather or news) and allowing the user to select a category of media content to be played. As discussed above, a jump request may invoke a high priority content request. When the user provides an action request (by selecting Act from the navigation screen 306), the action screen 310 is displayed, including a menu of actions such as, for example History; Info; Share (causing the song or artist to be shared with one or more other subscribers as selected by the user), Buy (causes display of the cost of the album and song with a purchase indicator allowing the user to purchase either). If the user selects 'Info,' a song detail screen 312 may be displayed, including information about the song, such as the song title, artist, and information about the artist. If the user selects History, a listing of the history 314 of songs recently played may be shown. The user also may select to jump to a specific song.

The user may also select the tools symbol to receive a listing of available tools. Among the tools, the user may select to fine tune the program, which causes the Fine Tune screen 316 of FIG. 4*b* to be displayed for modifying the attributes of a program. User inputs via the Fine Tune screen 316 of this example embodiment comprise explicit feedback as discussed herein and may be used by the server 18 to modify the template associated with the program. Specifically, the Fine Tune screen 316 of this example allows the user to adjust the relative amount of one or more sub-types of content, such as musical styles, included in a program. For example, by "rotating" the adjustment knobs 321 the user may increase or decrease the likelihood of selection of one or more sub-categories of content, which in this example include the sub-types (of music) as classified by degree of similarity to other music in the program ("eclectic" knob), artist obscurity ("garage" knob), and song obscurity ("deep cuts" knob). As will be evident to those skilled in the art, these sub-categories are for example purposes only and various implementations of various embodiments may allow the user to adjust the content of one or more other sets of sub-categories (such as, for example, increasing or decreasing the likelihood of selection of (1) jazz and blues; (2) vocal and non-vocal content; (3) 70s, 80s, 90s, and 2000s music; (4) popular and obscure, or (5) all of these sets of sub-types; or others. The user also may edit the seed artists that are associated with a program, whereby music from the seed artists and artists of music similar to the seed artists is included in the program. A seed artist display 318 lists the seed artists available for a given program and allows the user to change the seed artists.

The user also can adjust the relative quantity of each category of content as represented by the horizontal bars 322. The user selects the content category, which in this example includes music, talk, traffic, weather, or news, and uses the device controls to increase or decrease the frequency that the selected content category appears in the compilation data associated with the program. The user also may elect to change the on-air personalities, (e.g., the DJs) by selecting the personalities 323 on the screen 316.

Media Content Delivery System 100

The templates corresponding to the programs are managed at the server 18, and used to construct the compilation data for the programs for the users. As discussed, along with other information, the compilation data associated with a program identifies the content elements (e.g., the songs and segments, play lists, etc.) and the playback algorithms for the program. An intelligent client-server architecture also may ensure that the compilation data and content are delivered to the portable communication device 12 in an efficient manner. The delivery of the media content to the user devices may consider, and be based on, the time-sensitive nature of content, the geographic location of a subscriber, the power and connectivity status of the portable device, the status of the network utilization, and the explicit demands of the network operator. Content that is not time-sensitive (or that is less time-sensitive than other content) is referred to herein as "static content" and may include, for example purposes only, content such as songs, liners, promotions, advertisements, event information, comedy segments, and some on-air personality commentary. Static content elements may be delivered to a user device during one more time periods of increased available wireless data capacity, such as, for example, during network off-peak hours, and/or when the wireless network 16 is operating well-below capacity. Static content also may be delivered to the device while the device has alternate lower cost or high bandwidth connectivity options (via the alternate connectivity option), and/or while the device 12 is charging. Much of the static content may remain stored on the device 12 for days or weeks and be played and replayed without consuming additional network 16 capacity.

Content that is time sensitive is referred to herein as "dynamic content" and may be delivered just prior to the anticipated presentation of content or may streamed for immediate presentation. Dynamic content elements may include, for example purposes only, content such as traffic, some news, weather, sports and the like.

Each device 12 may intelligently request and receive static content from the server 18, according to a schedule that is based on subscriber's location to increase the efficiency of utilization of wireless network 16 and according to the device's status (e.g., when it is plugged in; when it has viable signal strength; and/or when it has access to an alternate network such as WiFi or the Internet (e.g., via a computer). The timing of delivery of content may be coordinated to minimize any network congestion amongst user devices that are being served. The operator of the network that provides connectivity of the user device may specify how bandwidth utilization for delivery of content is allocated on a device-by-device basis and/or on a geographic basis in order to optimize utilization of the network and coordinate it with other services that utilize the network.

Figure 5:
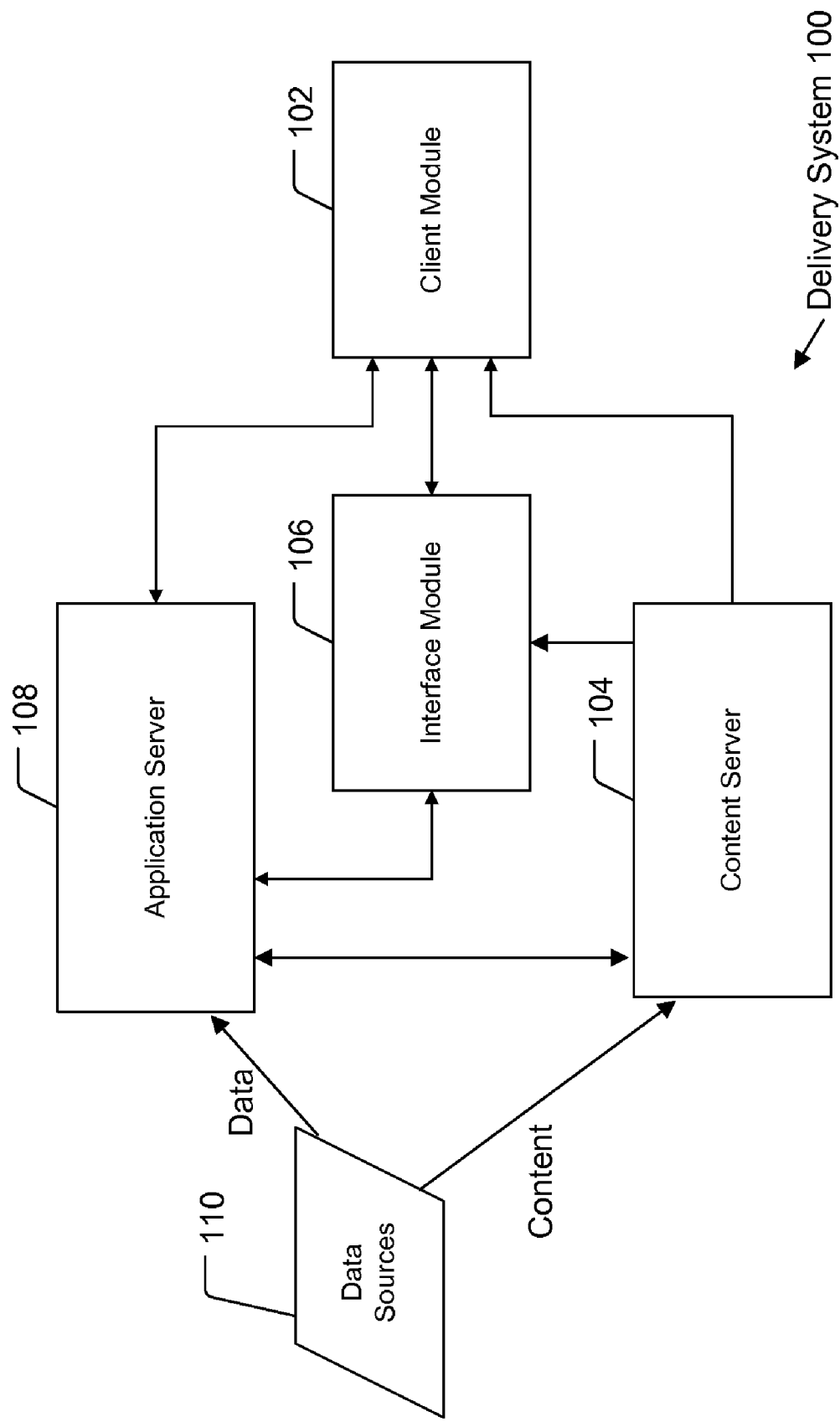
FIG. 5 is a block diagram of a media content delivery system in accordance with an example embodiment of the present invention.

FIG. 5 shows a media content delivery system 100 according to an example embodiment of the invention. A client module 102 resides on the user device 12 (see FIG. 1), which, as discussed, may comprise any device capable of playing media content, such as a mobile telephone, a personal computer 14, a portable media player, a car audio system, a home entertainment center, an access device 15, a multifunction device, or another audio device or video device. Media content is communicated to the client module 102 from a content server 104. The content server 104 may reside, for example, on the server 18 shown in FIG. 1. The media content may be transmitted directly to the portable device 12, either over the wireless network 16 or a wired network (e.g., the internet 22). For example, in some embodiments the portable communication device 12 may support protocols for accessing the internet, (e.g., serve as an access device 15). In other embodiments, the media content may be transmitted indirectly, such as through an interface module 106. The interface module 106 may reside, for example, on a personal computer 14, or another access device which has access to the internet, while the client module (in this example) may reside on a mobile telephone.

The media content delivery system 100 also may include an application server 108, which may form part of the server 18 of FIG. 1. The application server 108 processes user data and user feedback to modify templates for constructing programs for programs. Compilation data is communicated to the client modules 102, either directly or indirectly (via the interface module 106) from the application server 108. The application server 108 also may perform digital rights management of protected media content, and other programming, communication, and administration functions. User data (e.g., initial user data or feedback) may be received by the application server 108 via the internet through a web site portal (or via wireless network 16) from the client module 102, either directly or indirectly via the interface module 106.

The interface module 106 may detect whether the portable communication device 12 is present, respond to requests from the client module 102 to upload user feedback (e.g., behavior and ratings) and/or preferences to the applications server 108, and pass such requests to the application server 108. In addition the interface module 106 may receive communications from the application server 108 and content server 104 to be provided to the client module 102. In some embodiments, the interface module 106 executes in the background on the user's personal computer 14, access device 15, or other device 12. In other embodiments a user interface may be included as part of the interface module allowing a user to initiate communications to request new programming, provide explicit and implicit (ratings) feedback, etc., from the device hosting the interface module.

Data sources 110 including streaming content may be provided to the delivery system 100. Various publishers may grant licenses for the distribution, airing and use of media content. In this example embodiment, data from the data sources 110 may be provided to the application server 108 while content (including streaming and recorded content) from the data sources 110 may be provided to the content server 104. In another example embodiment, content 110 is stored on the application server 108 where programming and digital rights management is performed, while streaming media content 112 may enter the system directly to the content server 104. As discussed elsewhere, the content may comprise any and all type of media content such as audio (songs, albums, talk, news, weather, on-air personalities, lines, advertisements, promotions, user-generated, etc.) video (music videos, talk shows, news casts, weather shows, advertisements, promotions, movies, television shows, sporting events, variety shows, user-generated, etc.) and/or other content or content categories. In some embodiments, data of the content (including streaming content) received by the content server 104 may be provided to the application server 108 from the content server 104.

The data received by the Application server 108 may include data about the content and is referred to herein as metadata. Depending on the embodiment, various metadata may be included or omitted. In this example embodiment, metadata may be provided to the Application server 108 and used by the server 108 to provide a seamless presentation of the content elements (i.e., a presentation that is radio-like or television-like even though it may be customized). The four categories of metadata used in this embodiment include cues, fade times, layering flags, and gain values. "Cues" is meant to refer to time positions used to control the playback timing of adjacent content elements. Fade Times refers to time values used to specify durations of transitions when beginning and when ending a content element. Layering flags refers to indicators that specify whether content elements can be overlapped during playback and gain values refer to decibel values used to ensure overlapping and adjacent content elements are played at consistent volume levels. Some embodiments may use a subset of these listed metadata categories (such as cues and fade times) and other embodiments may use additional metadata.

Figure 6:
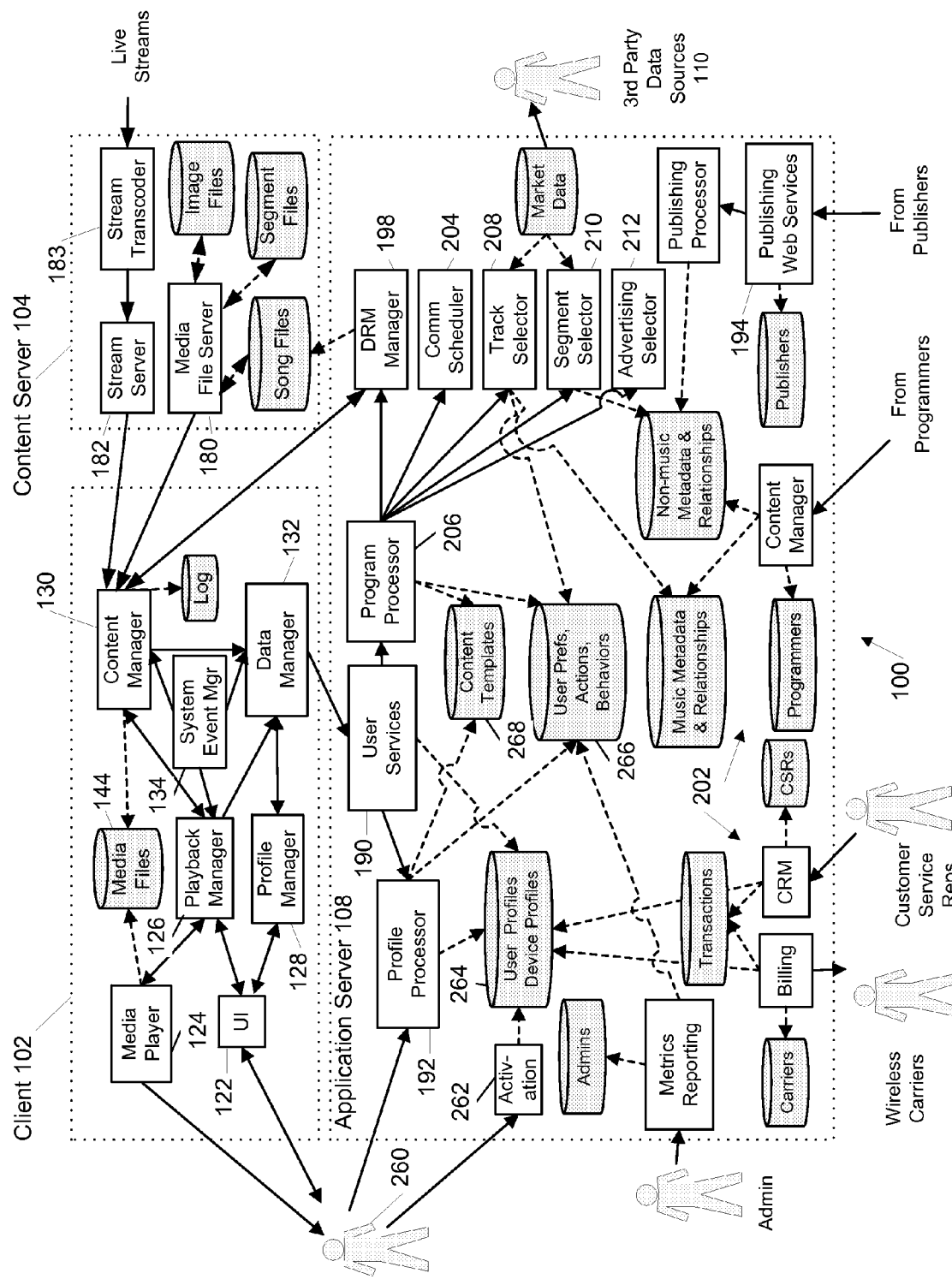
FIG. 6 is a detailed block diagram of a media content delivery system in accordance with an example embodiment of the present invention.

FIG. 6 provides a more detailed illustration of the functional components of an example embodiment content delivery system 100. As will be evident to those skilled in the art, other embodiments of the present invention may include more, fewer, or different functional components. In addition, the functional components illustrated (such as those of the application server 108 and the content server 104) may be implemented in software on one or more or more computer systems or devices that are co-located or distributed, depending on the embodiment and/or implementation.

The client module 102, which typically resides on the user device 12, may include a user interface 122, a media player 124, media content files 144, and various management programs, including a playback manager 126, profile manager 128, content manager 130, data manager 132 and system event manager 134. A more detailed illustration of the processes of these modules is shown in FIG. 7.

Figure 7:
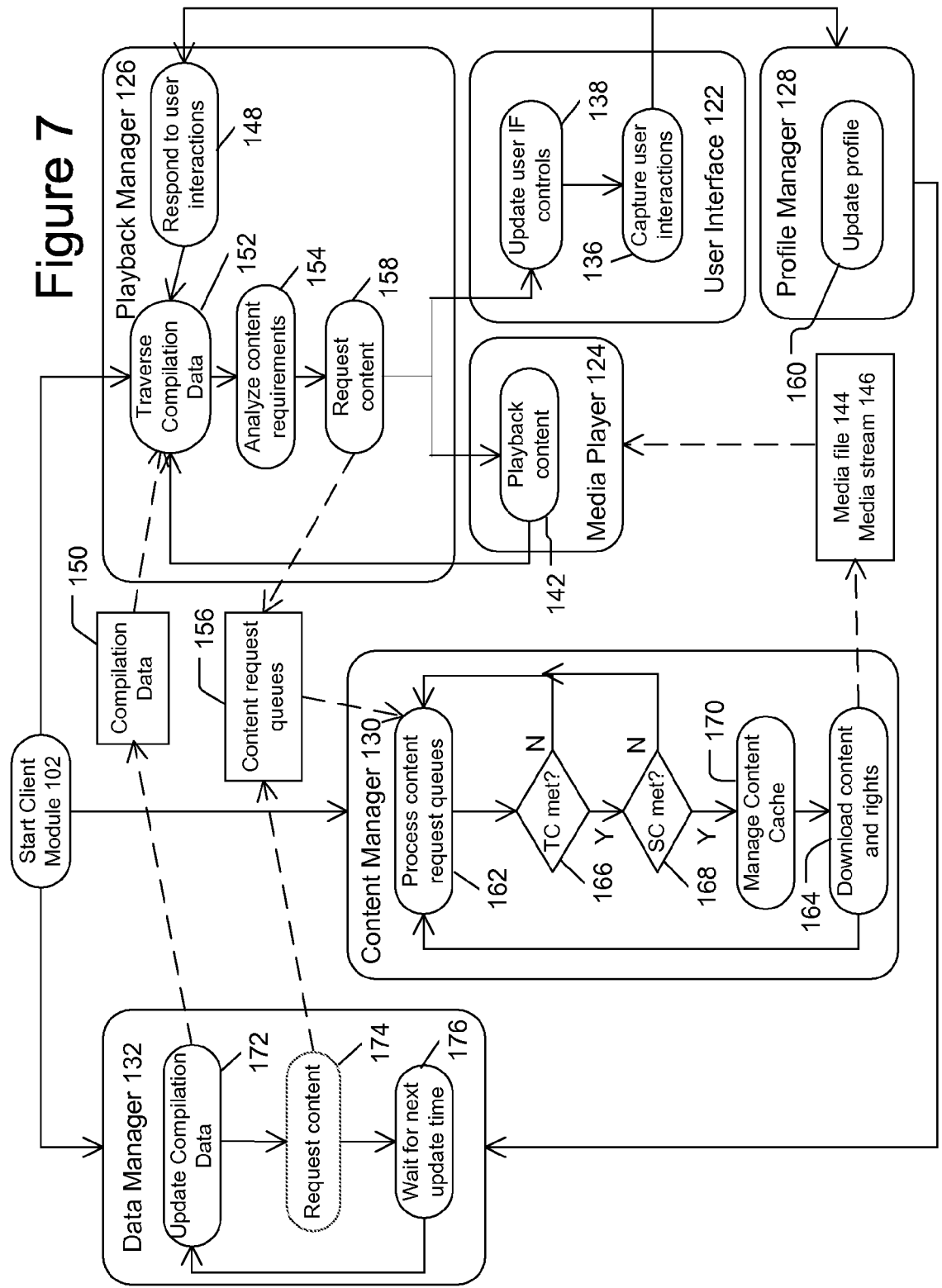
FIG. 7 is a flow chart of processes for a client module in accordance with an example embodiment of the present invention.

Referring to FIGS. 6 and 7, the user interface 122 implements screens (such as those shown in FIGS. 4a and 4b), menus, and facilitates key entries and other input/output functions that enable the user to control the media services on their portable communication device 12. A user may control playback, view content-related materials and messages, and edit preferences. User interactions may be captured by process 136 and logged (stored in memory). Some example requests that the user may trigger are: select programs, start, stop and pause programming; skip a song; jump to an item (such as news, traffic or weather); rate a song or other item; share an item (e.g., song, artist, or program) or program preferences with a group or person; and buy an item. Enforcement of some parameters may be implemented, such as limiting the number of song (or other content element) skips per hour, and limiting the number of advertisement skips per hour. Program changes may be logged, such as, for example, when the user scrolls through a list of programs, and selects a first or different program. A user also may modify a program to add or edit (e.g., via the fine tuning screen) or delete (unsubscribe to) a program. As discussed, a user, for example, may edit the parameters for a given program (e.g., via a fine tune screen). The user also may manage communications, such as by setting or altering specific times and days or recurrence periods for performing media content and compilation data updates from the application server 108; or by manually requesting an immediate update from the application sever 108. As the content changes the user interface commands and screens may be updated as well by process 138.

The data manager 132 of the client module 102 on the user device 12 may communicate with the application server 108 (directly or through the interface module 106 depending on the connection) to update the server 108 with explicit feedback and user behavior history (e.g., implicit feedback) and to receive updated programs and metadata for determining content. At step 172 the data manager 132 communicates with the server 108 to receive the updated or new compilation data. Based on the new or updated compilation data, process 174 determines what new content (e.g., songs) are needed and provides content request data to the content request queues 156. Process 176 waits for the next update time (e.g., based on the download schedule) or triggering event in order to initiate process 172 again. The processes of the data manager module 132 may be performed according to a download scheduled and completed daily, weekly, monthly, or at any other desired interval or time and may be performed according to a triggering event, such as receiving a command from the server 108, a user request, a user providing feedback (fine tuning screen, ratings, etc.), a user traveling (e.g., driving or flying) to a new location (e.g., and needing new traffic, weather, and news content), and/or any other triggering event. In addition, different categories of content and content priority may be downloaded according to different schedules and/or events. The compilation data 150 received from the server and the content selected for presentation is provided to the playback manager 126.

The playback manager 126 receives requests from the user interface 122, responds to the user requests at process 148, traverses the compilation data at process 152, analyzes content requirements at process 154 and requests content by adding an entry to a content request queue 156 at process 158. The playback manager 126 determines playback sequence based on the compilation data 150 to queue up items, and in response to specific user requests to play a specific item. For example, a user request for content (e.g., an on-demand content request for, for example, traffic, weather, or news) may be provided to the content request queue 156 (the high priority queue) if the content has not been received and, upon confirmation from the content manager 130 that the content is ready for playback, to the media player 124. The playback manager also queues items for play at scheduled times according to the compilation data 150 and provides requests for dynamic content (traffic, weather, news, etc.) to the content request queues 156.

The content manager 130 communicates with the content server 104 and may process content requests from the content request queue 156 to stream media and download media files and the corresponding media rights to local storage (on the device 12) based on a download schedule, content type and priority, charging status, and other factors at process 164. Process 162 processes the content request queues to ensure that higher priority content is processed before lower priority content. If while a first content request is being downloaded a second higher priority content request is received, the first request may be stopped, the second request completed, and then the first request resumed. Time criteria is evaluated at step 166 to determine if the current time is within a window of time (e.g., based on schedule provided by the client 102 to server) during which medium and/or low priority content is to be downloaded. Next, if the current time is within a selected window, process 168 determines if the state of the device satisfies state criteria such as, for example, determining the availability of one or more preferred networks, external power, and/or voice call inactivity. If the result of either process 166 or 168 is negative, the control flows to process 162. If the result of both processes 166 and 168 is affirmative, the method continues to process 170 to optimize (i.e., improve the efficiency of) the content store. High priority content, in many embodiments, may not be processed by modules 166 and 168 and may be immediately requested. Process 170 manages the local memory and cache content by removing unnecessary files (e.g., expired advertisements, promotions, talk, news, music, etc.), and to enforce user-specified storage limits, to allow for addition of new content items and to reduce or minimize the amount of future downloading required. For example, this process 170 may remove all expired and dynamic content files (traffic, weather, news, etc.), calculate how much space is required to be clear, assign priority order of remaining items to download, remove items that are not in the current log from lowest to highest priority until enough space is available.

The media player 124 accesses media content stored (media files 144), buffered or streamed onto the portable communication device 12. The media player 124 may decode, decompress compressed content and decrypt encrypted content as necessary. The media player 124 responds to requests 142 to play a media file 144; play a media stream 146; stop or pause playback; move to a position; get the current position; set the volume; and set other audio parameters. In addition, the media player 144 uses the metadata do ensure a seamless presentation of the content to the user. In an example embodiment the media player 124 may include multiple channels, and mix the output of those channels in such a manner as to provide smooth transition between segments.

The profile manager 128 analyzes user interactions, such as whether a user skipped, replayed and/or rated a segment and whether a user modified any attributes of a program. Process 160 modifies the compilation data to reflect some or all of the user interactions and notifies the data manager 132 of the interactions, which are transmitted to the server upon a subsequent data communications session for future use in constructing compilation data for the same user and other users.

The system event manager 134 monitors changes in system status, such as power source, battery charge level, network connectivity, and call notification. The status manager 134 may notify the other program modules 122-132 to interrupt or modify their activity. For example, the system event manager 134 may receive requests for data (e.g., time and charging status) from the content manager 130. The system event manager 134 also may implement specific power management protocols and diminished connectivity response protocols.

The client module 102 typically receives content from the content server 104, which may be housed on a remote computer system (e.g., server 18). As shown in FIG. 6, an example embodiment of the content server 104 may include a media file server 180 and a streaming content server 182. The media file server 180 transmits requested media files to the client module 102 directly using the wireless communication network 16 or indirectly over the internet 22 through the interface module 106. The streaming content server 182 transmits streaming media content to the client module 102 over the wireless communication network 16 or via the internet. In some embodiments, the streaming content is reformatted before being transmitted to the client module 102. In such an embodiment, a streaming media transcoder 183 may be included to transcode the stream into a client-compatible format.

Application Server

As discussed, the user may access a web site (not shown) to communicate with the application server 108 to register for a media content service, update their user profile, and browse, search, select and edit various program templates, including modifying selection of artists, genres, and styles, programming sequences, and creating custom programming sequences. This data may be provided to the profile processor 192, which may access the user profile, and templates to select a media genre and style, and to select seed artists for a template, as well as modify other attributes of a template.

A communication scheduler process 204 manages communications with the client module 102 of the various subscribers. As previously described, a user may schedule communications to occur periodically, aperiodically and upon request to update the user's program preferences and program templates. The communication scheduler 204 may maintain the communication schedule for each user, and alter the schedule as needed based on location of user, content demands of other users in nearby locations, content requirements, client device capabilities, user listening behavior, and/or network provider requirements (wireless and/or wired network requirements). The schedule also may be altered according to whether a portable communication device 12 is plugged in or charged, whether the device 12 is docked or otherwise coupled to a computer 14 or access device 15, and/or whether the device 12 has a low cost (e.g., free) communication link available (e.g., WiFi). The rules used by the scheduler 204 may be propagated, in part, from the wireless service provider. For example, instead of having all subscribers within a zip code, cell site service area, or other area initiate downloading at the same time (which could bog down the network), downloads of content to subscribers serviced by common infrastructure and/or resources of the wireless network provider may be distributed over time. More specifically, downloads may be staggered so that only a fixed or small percentage of the total subscribers in an area are ever downloading at the same time or downloading large amounts of media (e.g., songs) at the same time.

The user services process 190 provides the log file from the client 102 to the program processor 206 and may request the compilation data 150 from the program processor 206 to provide to the client 102.

The program processor 206 generates programs which are downloaded to user's device 12 (e.g., a portable device, personal computer, etc.). In one embodiment compilation data is a log of media selections. The media selections may include, for example, specific songs, talk segments, advertisements, podcasts, and specific streaming media clips, such as updated local news, weather and traffic reports. The program processor 206 may initiate a song selector process 208, a segment selector process 210 and/or an advertising selector process 212 to generate the program.

Following is an example scenario of user interactions with the system 100. A user 260 (see FIG. 6) accesses a web site of the content service to register for the service and submit demographic and other information. An activation process 262 registers the user and a profile processor 192 generates and stores profiles 264, including a user profile and one or more device profiles for the client device(s) that the user may use to host the client module 102. The profile processor 192 may also create user preferences 266 based on feedback from the user. In some embodiments the initial preferences 264 are set based upon the information received during registration. Other preferences 266 may be updated over time based upon the user behaviors. The profile processor 192 also may select one or more programs based on content templates 268 for the user based upon the user preferences 264. The processor 192 may store any program selections made by the user at the time of registration. Once registered, the user also may edit program selections through the client module 102 or via the internet.

The program processor 206 then generates the compilation data for the user, by using content templates associated with the selected programs. The compilation data typically identify(ies) at least some of the media files. The compilation data and content may then be transmitted to the user device 12 (typically at separate times). For example, at some scheduled time the portable communication device 12 may access the application server 108. The user services process 190 may respond at the application server 108 by triggering the program processor 206 to communicate with the content server 104. The content server 104 may then transfer the content to the client module 102. In addition, user services process 190 may retrieve and provide the compilation data 150 (including metadata) to the client 102 of the user device 12.

As the user views and/or listens to the playback of a program, the user may enter input such as explicit and implicit feedback, requests to share content and/or program preferences, request to purchase content or advertised products, and/or other interactivity. The user interaction is logged and, in some instances (e.g., a request to purchase) may cause the client 102 to establish a communication link (e.g., to make the purchase). At scheduled times this behavior information may be transmitted back to the user services process 190 of the application server 108, allowing the profile processor 192 to update the preferences 266. Also, the program processor 206 may modify the content templates for that user based on such updated preferences and specific user interactions, (e.g., a request to add an artist to a program or perform other modifications via the fine tune screen).

The application server 108 also may include publishing web services process 194 that allows publishers to upload media content from data sources 110, to classify the rights of their content and to provide additional management of the media under their control. Publishers can indicate that the content may expire on a particular date and time, while other content may be available indefinitely. Traffic and weather may expire hourly as a default. Songs, videos, advertisements and other content may expire monthly. Such third parties also may receive feedback about their content. A digital rights manager (DRM) process 198 associates specific rights and expirations with media content and renews licensed rights as per an associated license. One or more service administration processes 202 manage transactions, such as client (user) billing, carrier fees, metrics reporting for advertising, advertiser billing, and customer service reporting.

Figure 8:
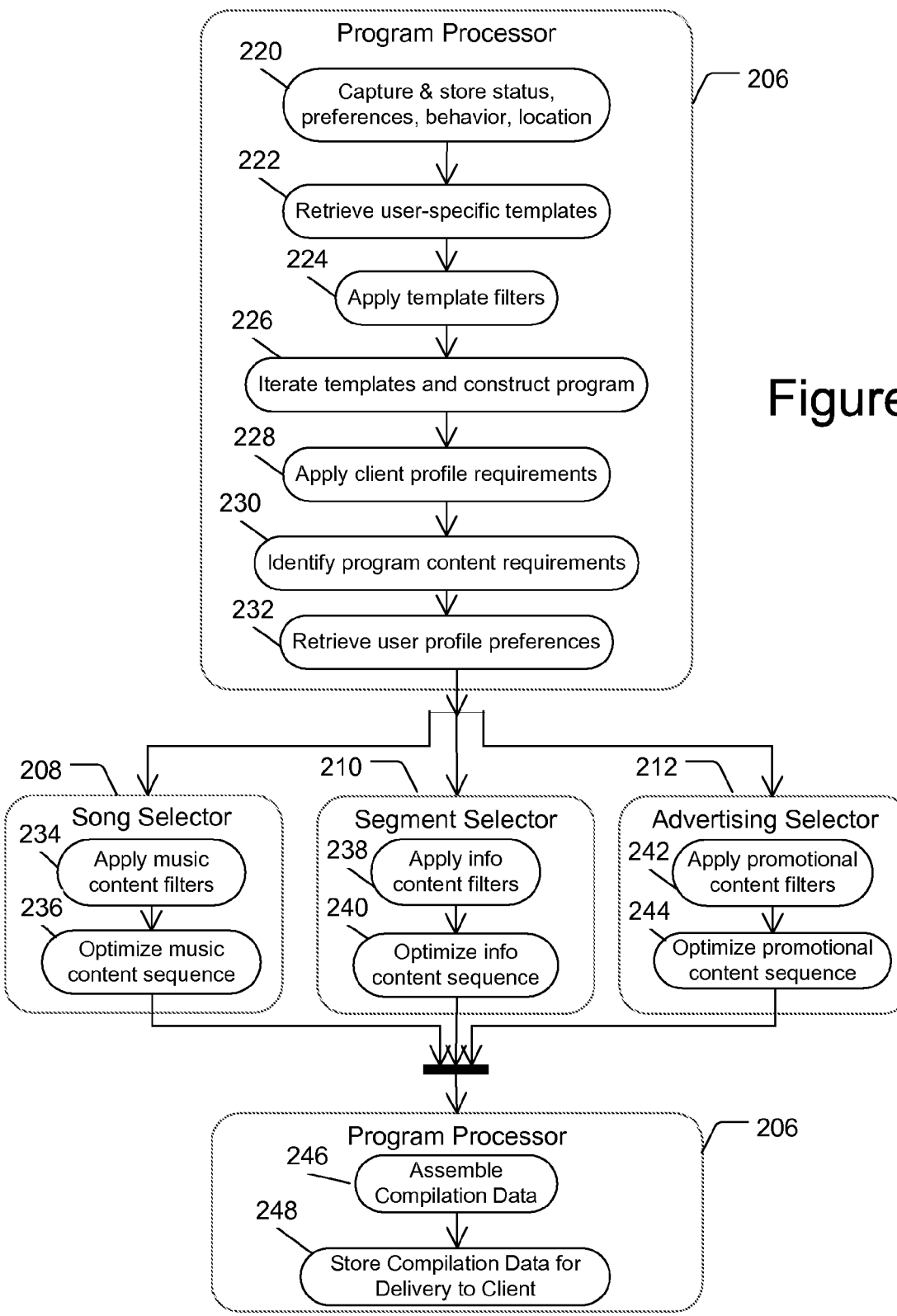
FIG. 8 is a flow chart of processes for an application server in accordance with an example embodiment of the present invention.

FIG. 8 illustrates the processes for generating compilation data for the users. Process 220 of the program processor 206 updates the server database 266 with user preferences (e.g., ratings, requested modifications) and behavior (e.g., skips, replays, percentage played, etc.). The process 220 also determines the status of the content element, such as whether or not the content element is stored on the user's device 12. The user location data also may be updated when available. User specific templates necessary to construct all the compilation data for a user are retrieved from the templates database 268 by process 222. Process 224 modifies the retrieved templates by applying user specific filters. This modification may be based on feedback from the user such as modification specified by the user (e.g., via the fine tune screen, rating, skips, etc.), such as the frequency with which to play a category or specific item of music or other content. An iterative approach may be implemented, for example, to step through the modified template to construct compilation data with the appropriate sequence and frequency of items at process 226. This process 226 may include creating a list of scheduled items (i.e., a scheduled play list) for such things as weather, traffic, and/or news. As discussed, the template may include a sequential play list of content elements of the various content categories.

At process 228 client profile requirements are applied, wherein device requirements are analyzed to ensure that media content selected is in a compatible format for the user device 12. For example, content with appropriate file format, compression scheme, bit resolution, and/or dimensions may be selected. In addition, the process 228 may retrieve information that the client 102 uses to ensure that the client 102 retrieves content according to appropriate download schedule. Based on the constructed compilation data, process 230 identifies the required content for the compilation data. For example, process 230 may determine what specific and how many non-specific songs (or videos) are required, what talk segments are required, what advertising is required, etc. For non-specific content, the process 230 may determine the number of slots available for unspecified content, which may be allocated (used) as part of a rotated play lists as described above. At process 232 the user's profile (including preferences and behaviors) are obtained, so they may be provided, along with the content requirements, to other processes used in assembling the compilation data.

The program processor 206 may initiate the song selector process 208, the segment selector process 210, and the advertisement selector process 212. The song selector process 208 may determine song identification data for lists of songs that most closely match user preferences and other criteria, and that comply with program rules. At process 234, the song selector process 208 applies music content filters derived from explicit and implicit user feedback and parameters derived from such feedback such as, for example, feedback relating to desired or undesired seed artists; genres, styles, listener ratings, listener behavior, artist relationships, degree of similarity to other music in the same program, artist obscurity, song obscurity and/or other parameters. This filter may change over time due to explicit and implicit "Influences." For example, subscribers may be grouped together based on demographics, location, etc. to define a filter. If many people in a group dislike a particular song or artist, the filter may adapt based on skips and bad ratings among the group members. For example, a given artist may be removed from future content selection (for a given program) for all those in that group. In addition, some subscribers of each group may be selected (or asked) to be an influencer wherein feedback provided by such influencer is used to modify templates for all those in the same group. At process 236, the music content sequence is optimized (or enhanced) with the order of the songs arranged to comply with rules for artist separation, tempo separation or other metrics selected to provide an enjoyable listening experience.

The segment selector process 210 identifies content elements for segments of a program, such as segments of talk, news, weather, traffic, liners or advertisements; or a segment which introduces another segment or song (e.g., talk-up or liner). At process 238, the segment selector process 210 applies information content filters based on a selected category, service partner affiliate, on-air personality, location, user preferences, and/or listening behavior. Process 240 optimizes (or enhances) the information content sequence to determine an order of segments within the program.

The advertising selector process 212 may determine which advertisements match specific criteria and scheduling rules. At process 242, the advertising selector process 212 applies promotional content filters to select specific advertisements based on affiliate, listener demographics, location, and listener behavior. At process 244, the promotional content sequence is optimized (enhanced) to satisfy advertiser preferences, such as spacing advertisements among competitors.

At process 246, the program processor 206 assembles information of the songs, segments and advertisements into the compilation data. At step 248 the program processor 206 stores the compilation data and content for transmission to the client module 102.

FIG. 9 provides a graphical representation of an example embodiment of a content delivery system according to the present invention. More specifically, FIG. 9 illustrates a delivery scheme for delivery of the compilation data, static content, dynamic content, and on-demand content in one example embodiment. Referring to 301, the compilation data may be delivered without restrictions. For example, the compilation data may be delivered by itself or with (as part of or during the same time period) static content elements, dynamic content elements, or on-demand content elements. Referring to 302, in this example embodiment, static content elements (such as songs, videos, advertisements, etc.) may be delivered during one or more time periods of increased available wireless network capacity (e.g. during off-peak time periods). In addition, static content may be delivered when the user device is accessible via another communication link that does not use the wireless data network (e.g., when the user is connected to the Internet via a WiFi network) and/or when the user device is coupled to an internet access device such as the user's computer. Delivery of static content via an alternative communication link or via an internet access device may occur at anytime because such delivery does not utilize resources (or reduce capacity) of the wireless data network. Further, the time of delivery of static content also may be based on one or more parameters determined by an operator of the wireless data network (to evenly distribute the delivery of static content via a particular component of their infrastructure such as a cell site over a time period to reduce network congestion), the location of the device, and/or the subscription level of a user of the device.

Referring to 303, dynamic content elements may be delivered according to a schedule such as, for example, at twenty-five minutes and fifty-five minutes after each hour to allow that dynamic content to be up to date when presented to the user at each hour and half hour. Depending on the embodiment, some dynamic content (e.g., weather) may be delivered according to a different schedule than other dynamic content (e.g., traffic) and such schedule may be based on the frequency and time that the user desires to hear (or view) the dynamic content or the time at which playback of the dynamic content is scheduled to occur. Referring to 304, on-demand content typically is delivered substantially immediately after a user request for the content.

Following are three example scenarios of listening and user interactions. The first interaction and experience is that of Chris, a 24 year old male from Los Angeles, Calif. who owns music by various artists in the rhythm and blues genre (among others) and listens to Hot 92 Jamz®. In the morning, he grabs his wireless phone, gets in his car and begins his commute. He connects his phone to his car audio system and selects a command to start the media content delivery service which implements the system 100 described above. He immediately hears a welcome message ("Good morning and welcome to the Hot 92 Jamz on Sprint®"), followed by the latest traffic report as his welcome play list. Then a sequential play list commences play, which may include the national news. He does not want to hear the news at this time, so he presses a key corresponding to a skip function. The next item may include a sports report with content selected based on his location. For example, when in the Los Angeles area, a segment on the Lakers® from an AM sports station in Los Angeles may be played. In addition, he attended Syracuse University and a segment about the Syracuse University basketball team from a radio station in Syracuse, N.Y. may be played—irrespective of his location. He may receive a call while listening to the content and the audio playback pauses to allow him to take the call. Upon ending the call, the sports report continues automatically where it was paused. Should he forget what the sports cast was talking about, he may press a button corresponding to replay, allowing play to skip backwards to the beginning of the segment, or further, as necessary. At the end of the sports report, a segment of talk by a DJ from another radio station may play. This DJ does the evening show on Hot 92 Jamz®, but Chris likes to listen to the DJ in the morning, so the segment is included here. The DJ may begin his show with his usual entertaining rhetoric about his take on the current news in the world of R&B, then introduce a song. After a Hot 92 Jamz liner, a "deep cut" song from Mary J. Blige's first album, plays. After the song ends, another liner plays saying "Now, new music called Gruve Song from up-and-coming DC area songstress Tamara Wellons" (which was selected for him because it correlates well to the music of Mary J. Blige and Alicia Keys, two of his favorite artists). A Hot 92 Jamz ID then plays, followed by the song. He likes the song and selects the 'Act' command and the "Info" function so he can learn more. The phone display shows an artist description and also may connect to the network to begin downloading and caching additional audio about the song or artist. Based on the received information, after the song, a sixty second blurb may play about Tamara Wellons: such as who she is, where she comes from, snippets from other songs, when she is playing near his location (e.g., in Los Angeles), and/or other information. In addition, either automatically or upon user command (depending on the embodiment or user or system settings), Tamara Wellons may be added to Chris' list of favorite artists, which is accessible from his Web browser (phone or PC) and which allows Chris to get more information, hear more music samples, subscribe to concert notifications, and buy songs. The service 100 has stored the fact that Chris likes Tamara Wellons and will update filters for his compilation data templates for the corresponding programs to include Gruve Song and Spring Giddiness, another of her songs, into future programming, as well as music from similar artists.

The second exemplary interaction is for Alice, a 34 year old female from Potomac, Md. who has just left work at about 5:30 pm in downtown Washington DC. Alice is experiencing traffic congestion on her way to picking up her son from day care. She turns on her service-enabled car radio, which automatically selects Alice's "commute" program, which she calls "Homeward Bound." Since she has set her preferences for "Homeward Bound" to always play traffic first, the first thing she hears is the latest traffic report from Progressive Talk 1260® (she listens to Imus' live show® in the morning every day on Progressive Talk 1260 broadcast) for the DC-Maryland suburbs. While listening to the traffic report she hears that the GW Parkway is blocked by an accident and immediately embarks on an alternate route. After the traffic, Alice hears lifestyle discussion from Loo & Lori® (a pair of radio personalities), who are the 97.1 WASH-FM® morning team that Alice loves but always misses because she is listening to Imus in the morning. After the lifestyle discussion, Alice hears music from LeAnn Rimes. Alice does not want to hear that music right now so she presses the Skip button (if she never wanted to hear it again she could press a key to give it a "thumbs down" vote). The song immediately fades out and segues into music from Mariah Carey (one of Alice's favorite artists). After the song ends, a promo plays announcing the locations for the WASH-FM Holiday Toy Drive, followed by an advertisement for a special sale at Macy's this weekend. Alice needs to do some serious Christmas shopping and presses the "Tell Me More" button. After the advertisement finishes, she hears a sixty second blurb with more detail about the sale as well as hours and directions to the store. She will later receive an email with all relevant information and a special coupon about the sale. Next, Loo & Lori return to discuss advice on buying diamonds, which she finds very interesting, followed by holiday office party etiquette, which Alice doesn't want to hear. Shortly after that discussion begins Alice presses the Skip button to get to the next song, a song by Whitney Houston that she had never heard before. She bookmarks the song with a "thumbs up" vote so she can access and purchase it later on her PC. Later, she gets an email with links to the songs and artists she has rated a thumbs up where she can click the link to find out more information and/or purchase the song or CD of the artist. In addition, the service 100 has recorded her actions for modifying the template associated with her programs.

Carlos, a 45 year old male from Cleveland, Ohio grew up on Led Zeppelin® and Van Halen®. He is a loyal WMMS listener but is frustrated with today's new music and often resorts to listening to his iPod®. He hears about the WMMS personal radio service on a WMMS broadcast and signs up on his PC, where he tells the service operator all about the music he loves and indicates he only really wants to find new music (he can listen to all the classic stuff whenever he wants off of his iPod or his phone) and local concert information. He doesn't want to hear any news, traffic, sports, etc. Later that day, when he "dials up" the WMMS service on his wireless phone, WMMS' Big Rig® tells him he is about to hear several new bands that really rock old school. Next, he hears the first song. He doesn't like it, so he skips it. Then, another song, not bad but not quite what he wants. He skips that, too. When the third song plays, it reminds him of early Rush(, which he loves. He didn't realize this kind of music was still made today. He listens to it and gives it a "thumbs up" vote. As Carlos listens to more music, the service gets better and better at helping him find great new rock music, and Carlos becomes very loyal to his WMMS personal radio service. Other music services like satellite radio just play too much stuff he doesn't like, require constant channel flipping to find good music (usually halfway over when you do find it), and even if other personalized services are available, his WMMS personal radio service already knows his taste.

Although the specific example embodiment has been described with regard to a portable communication device having connectivity through a wireless communication network and the internet, other embodiments allow alternative client devices to store compilation data and content. Specifically, the customized content also may be delivered to a personal computer, home entertainment system, clock radio, or automobile audio system. Depending on the user device, connectivity may be achieved in various ways, such as wired, local-area wireless, and wide-area wireless connections. Content may be downloaded from personal computers, home media servers, tabletop media players, and/or from another user's client device. In addition, in some embodiments, the functions of the application server 108, content server 104, and/or client module 104 may be performed by the user's computer, home entertainment system, or automobile audio system. Alternately, in some embodiments, the user device may simply act as a media player and the bulk the other functions of the client 102 be performed by a remote computer (e.g., the server). While the invention has been described in the context of providing audio content, the invention is equally applicable for providing audio-video content to thereby provide a customized programmed television experience. In addition, some content may supplied by a user (e.g., user generated content) to the server to be included in content to be presented to other users.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method, implemented at least in part by a computer system, of providing customized content for a plurality of users and wherein a user device is associated with each respective user of the plurality of users, comprising:

receiving user information from the plurality of users;

for each of the plurality of users, constructing first compilation data that includes information identifying a first plurality of content elements based, at least in part, on the received user information;

wherein the first compilation data constructed for at least some users of the plurality of users is different;

transmitting the first compilation data constructed for each user to the user device associated with each respective user;

transmitting at least some of the first plurality of content elements identified by the first compilation data constructed for each user to the user device associated with each respective user;

audibly producing the content elements of the first compilation data to each of the plurality of users in accordance with the first compilation data;

wherein the first compilation data is constructed from a respective first template;

receiving feedback from a set of the plurality of users;

modifying the respective first template of each user of the set of the plurality of users based on the feedback; and for each user of the set of plurality of users, constructing second compilation data that includes information of a second plurality of content elements.

2. The method of claim 1, wherein some content elements audibly produced to at least some of the plurality of users comprise advertisements, and the method further comprises selecting at least some of the advertisements based on the user information.

3. The method of claim 1, wherein some content elements audibly produced to at least some of the plurality of users include information pertinent to a location of the user and other content elements include information pertinent to a second location supplied by the user.

4. The method of claim 1, wherein the feedback comprises implicit feedback.

5. The method of claim 1, wherein said audibly producing is performed by the user device associated with each respective user.

6. The method of claim 5, wherein the user device of each respective user receives the first compilation data via a wireless communication link.

7. The method of claim 5, wherein said transmitting at least some of the first plurality of content elements comprises transmitting at least some of the first plurality of content elements according to rules configured to reduce peak communications network utilization.

8. The method of claim 1, further comprising audibly producing the content elements to the plurality of users in a substantially seamless presentation.

9. The method of claim 1, wherein the first compilation data includes metadata for at least some of the first plurality of content elements.

10. The method of claim 9, wherein the metadata includes cue and fading time information.

11. A method, implemented at least in part by a computer system, of providing content to a user; comprising:

(a) constructing first data comprising information identifying a first plurality of content elements of a first content presentation for the user, wherein the first data is based on a first template;

(a2) transmitting the first data to a user device associated with the user;

(b) audibly producing at least a portion of the first content presentation to the user;

(c) receiving feedback from the user related to the first content presentation;

(d) modifying the first template to construct a second template;

(e) generating second data comprising information of a second plurality of content elements of a second content presentation based on the second template;

(e2) transmitting the second data to the user device associated with the user; and (f) audibly producing at least a portion of the second content presentation to the user; and performing steps a-f for a plurality of users and wherein at least some of the plurality of content elements of the second presentation are different for each user of the plurality of users.

12. The method of claims 11, further comprising:
generating data of multiple content presentations; and
wherein each of the content presentations is based on a different template; and
receiving a user request to present one of the multiple content presentations.

13. The method of claim 11, further comprising wherein said transmitting the second data to a user device associated with the user comprises transmitting the second data via a wireless communication network.

14. The method of claim 11, further comprising for each of the plurality of users:
selecting the first template based on information from the user; and
wherein the information from the user includes information of a media source.

15. The method of claim 11, wherein the feedback from the user comprises an indication that the user skipped a portion of a content element of the first content presentation.

16. The method of claim 11, wherein the feedback from the user comprises an indication of an assessment of one or more content elements of the first content presentation.

17. The method of claim 11, wherein the first plurality of content elements comprises a plurality of different categories of content elements and the feedback includes an indication to provide a differing amount of a category of a content element.

18. The method of claim 11, wherein at least some of said first plurality of content elements are scheduled for presentation at a particular time.

19. The method of claim 11, wherein the user device associated with the user comprises a mobile device, the method further comprising scheduling the transmission of at least some of said first plurality of content elements to the mobile device associated with the user in a manner to reduce network resources.

20. The method of claim 11, wherein at least some of said second plurality of content elements are stored on the user device prior to said generating the second data.

21. The method of claim 11, wherein the first data includes information of the identity and sequence of presentation of a plurality of the first plurality of content elements.

22. The method of claim 11, wherein the first data includes metadata associated with at least some of the first plurality of content elements.

23. The method of claim 22, wherein the metadata includes information of cues and fading times of at least some of the first plurality of content elements.

24. The method of claim 11, further comprising transmitting at least some of the first plurality of content elements and the first data to the user device at different times.

25. A method, implemented at least in part by a computer system, of providing customized content for a plurality of users, comprising:
receiving content preference information from the plurality of users;
storing metadata for at least some of a plurality of content elements;
for each of the plurality of users, constructing first compilation data that includes information identifying a first plurality of content elements;
wherein the first compilation data constructed for at least some users of the plurality of the respective users is different;
transmitting the first compilation data constructed for each user to a user device associated with each of the plurality of users;
audibly producing the first plurality of content elements to each of the plurality of users according to the first compilation data constructed for the respective user;
wherein the first compilation data is constructed from a respective first template;
receiving feedback from a set of the plurality of users;
modifying the respective first template of each user of the set of the plurality of users based on the feedback; and
for each user of the set of plurality of users, constructing second compilation data that includes information of a second plurality of content elements.

26. The method of claim 25, wherein the metadata comprises cue information and fading time information used to audibly produce the first plurality of content elements substantially seamlessly.

27. The method of claim 25, wherein at least some of the plurality of content elements comprise segments and other content elements comprise songs.

28. The method of claim 25, wherein the content preference information includes information of a media source.

29. The method of claim 28, wherein the content preference information further includes information of content tastes.

30. The method of claim 25, wherein the feedback comprises implicit feedback.

31. The method of claim 25, wherein the feedback comprises explicit feedback.

32. The method of claim 25, wherein said constructing the first compilation data includes selecting songs based on one or more implied public data relationships between songs.

33. The method of claim 25, further comprising integrating on-demand content elements into the first plurality of content elements audibly produced to each of the plurality of users.

* * * * *